(12) United States Patent
Shtilman et al.

(10) Patent No.: US 10,026,059 B2
(45) Date of Patent: Jul. 17, 2018

(54) SYSTEMS AND METHODS FOR MANAGING REPORTING DATA ON A HOSTED ON-DEMAND REPORTING SYSTEM

(71) Applicant: Avaya Inc., Basking Ridge, NJ (US)

(72) Inventors: Ariel Shtilman, Tel Aviv (IL); Arkady Karpman, Hod Hasharon (IL)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/194,196

(22) Filed: Feb. 28, 2014

(65) Prior Publication Data

US 2014/0247936 A1 Sep. 4, 2014

Related U.S. Application Data

(66) Substitute for application No. 61/772,271, filed on Mar. 4, 2013.

(51) Int. Cl.
*H04M 3/00* (2006.01)
*G06Q 10/10* (2012.01)
*H04M 5/00* (2006.01)
*H04M 15/00* (2006.01)
*H04M 3/51* (2006.01)

(52) U.S. Cl.
CPC ........... *G06Q 10/10* (2013.01); *H04M 3/5191* (2013.01)

(58) Field of Classification Search
CPC .... H04M 3/5175; H04M 3/51; H04M 3/5191; H04M 15/56; H04M 2215/202; H04M 15/58; H04M 2203/401; G06F 17/30424; G06F 17/30; G06F 17/30864; G06F 17/30902; G06F 8/38
USPC ........ 379/265, 266; 370/352, 353, 354, 355, 370/356, 357
See application file for complete search history.

(56) References Cited

U.S. PATENT DOCUMENTS

| | | | |
|---|---|---|---|
| 6,631,402 B1 * | 10/2003 | Devine | G06F 11/0709 707/E17.107 |
| 6,714,979 B1 * | 3/2004 | Brandt | H04L 63/166 707/999.003 |
| 6,760,727 B1 * | 7/2004 | Schroeder et al. | |
| 7,962,644 B1 * | 6/2011 | Ezerzer et al. | 709/238 |
| 8,300,797 B1 * | 10/2012 | Benesh et al. | 379/265.03 |
| 8,472,610 B1 * | 6/2013 | Steinbeck et al. | 379/265.02 |
| 8,811,597 B1 * | 8/2014 | Hackbarth et al. | 379/266.08 |
| 2003/0156706 A1 * | 8/2003 | Koehler et al. | 379/265.05 |

(Continued)

*Primary Examiner* — Ahmad F Matar
*Assistant Examiner* — Kharye Pope
(74) *Attorney, Agent, or Firm* — Stevens & Showalter, LLP

(57) ABSTRACT

An information managing system for managing contact center information is disclosed. The information managing system includes a plurality of receivers for receiving information from at least one data collector. The information managing system further includes a plurality of databases for storing the information received from the at least one data collector. The information managing system further includes a report generator comprising a user interface for receiving a plurality of search queries from a plurality of users. The information managing system further includes a database interface layer for performing one or more lookups on the plurality of databases based on the plurality of search queries received from the plurality of users, wherein results of the one or more lookups are displayed on the user interface of the report generator.

20 Claims, 9 Drawing Sheets

(56) References Cited

U.S. PATENT DOCUMENTS

| | | | |
|---|---|---|---|
| 2004/0028212 A1* | 2/2004 | Lok et al. | 379/265.09 |
| 2004/0083213 A1* | 4/2004 | Wu | G06F 17/3064 |
| 2006/0115072 A1* | 6/2006 | Kessinger et al. | 379/265.03 |
| 2006/0129499 A1* | 6/2006 | Combar et al. | 705/64 |
| 2008/0104104 A1* | 5/2008 | Nolan et al. | 707/102 |
| 2009/0003583 A1* | 1/2009 | Carretto | H04M 3/5175 |
| | | | 379/265.06 |
| 2009/0028134 A1* | 1/2009 | Reuss | 370/352 |
| 2009/0106802 A1* | 4/2009 | Zuckerman et al. | 725/91 |
| 2009/0265425 A1* | 10/2009 | Lipscomb et al. | 709/203 |
| 2009/0310764 A1* | 12/2009 | Gerhart | G06Q 10/06 |
| | | | 379/142.04 |
| 2010/0246801 A1* | 9/2010 | Sundaram et al. | 379/265.09 |
| 2012/0047107 A1* | 2/2012 | Doddavula et al. | 707/620 |
| 2012/0082303 A1* | 4/2012 | D'Arcy et al. | 379/201.02 |
| 2013/0191185 A1* | 7/2013 | Galvin | G06Q 30/01 |
| | | | 705/7.37 |
| 2013/0208880 A1* | 8/2013 | Lovy et al. | 379/265.03 |
| 2014/0211931 A1* | 7/2014 | Wendt | 379/265.03 |

\* cited by examiner

| Reported Element | Interval Time | Database |
|---|---|---|
| Agent | Intra Daily | Intraday_January_2013<br>Intraday_February_2013<br>............ |
| Agent | Daily | Day_January_2013<br>Day_February_2013<br>............ |
| Agent | Weekly | Weekly_Year_2013<br>Weekly_Year_2014 |
| Agent | Monthly | Monthly_Year_2013 |
| Skill | Intra Daily | Intraday_January_2013<br>Intraday_February_2013<br>............ |
| Skill | Daily | Day_January_2013<br>Day_February_2013<br>............ |
| Skill | Weekly | Weekly_Year_2013<br>Weekly_Year_2014 |
| Skill | Monthly | Monthly_Year_2013 |

FIG. 4B

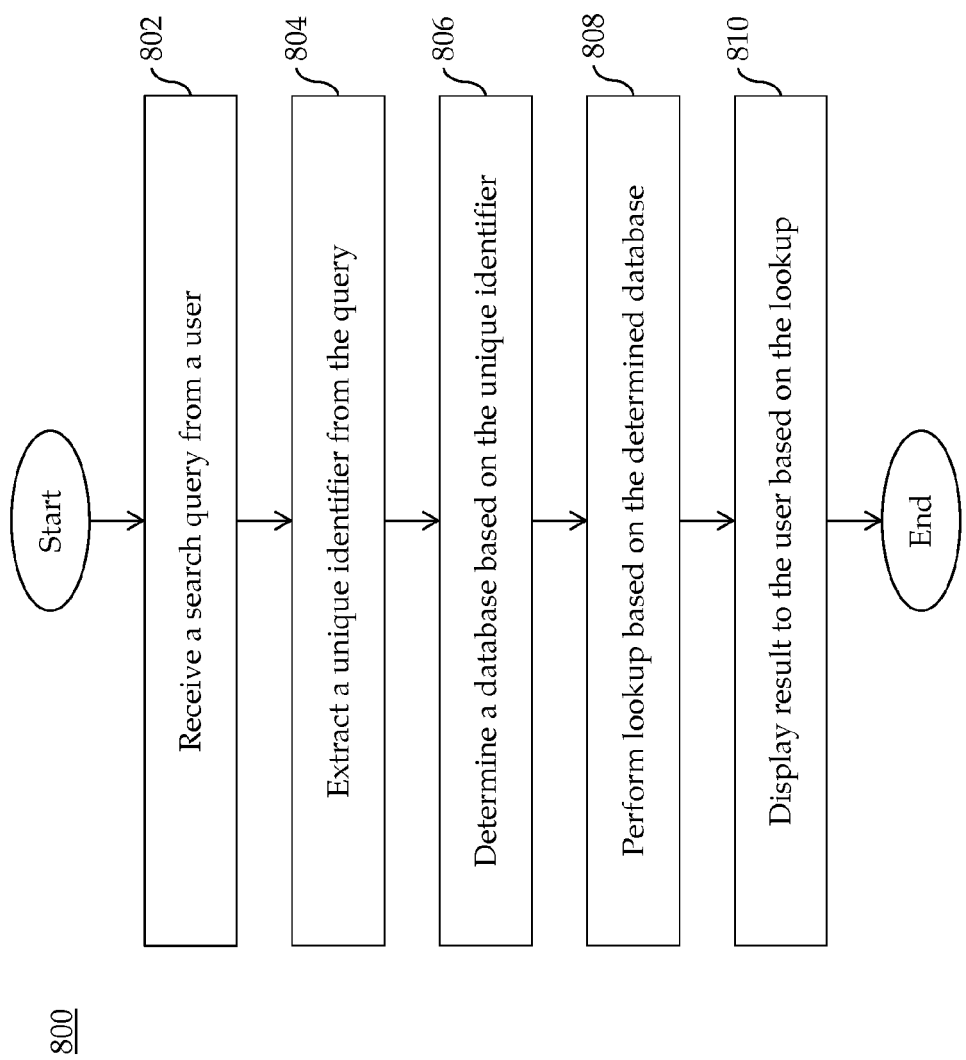

SYSTEMS AND METHODS FOR MANAGING REPORTING DATA ON A HOSTED ON-DEMAND REPORTING SYSTEM

CROSS-REFERENCE TO RELATED APPLICATIONS

This application claims the benefit of U.S. Provisional Patent Application Ser. No. 61/772,271, filed Mar. 4, 2013, entitled "HOSTED CONTACT CENTER REPORTING SOLUTION", which is incorporated herein by reference in its entirety.

BACKGROUND

Field of the Invention

Embodiments of the present invention generally relate to a system and method for managing contact center data and particularly to a system and method for managing contact center reporting information and data.

Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts. The contact center includes a database for storing information of the contact center. Contact centers distribute contacts, whether inbound or outbound, for servicing to any suitable resource according to predefined criteria. In many existing systems, the criteria for servicing the contact from the moment the contact center becomes aware of the contact until the contact is connected to an agent are client or operator-specifiable (i.e., programmable by the operator of the contact center), via a capability called vectoring.

The primary object of the contact center is to store all the customer related information as data that can be used to serve the customers in a better way or for speech analytics. Traditionally, in contact center deployments, vendors such as Avaya, Cisco, Genesis, and so forth, install on-premises equipment or hardware such as, gateways, servers and software that run in the contact center. Software that runs in the contact center usually includes a reporting system that allows a customer to run contact center services on a private Local Area Network (LAN). Contact center information is then stored on the reporting system that was installed by contact center vendors. However, this approach purely exists on the on-premises equipment that runs on the customer LAN.

An ongoing challenge in the standard on-premises contact center environment is the scaling capability, where the customer runs a contact center reporting solution and a significant amount of data is generated. Even with a medium sized customer, for example, terabytes of data is generated. In a traditional approach, the data is usually stored in a set of databases or in the on-premises equipment of the contact center. The customer has two different options to handle the generated data.

First, the customer configures the on-premises equipment with a first in first out (FIFO) configuration, meaning all the data can be deleted automatically by the reporting system based on customer configuration. The customer configuration includes FIFO or number of days the data is stored in the set of on-premises databases. For example, if the customer configures the on-premises equipment to store data for 60 days, any data older than the 60 days is automatically deleted from the set of databases in order to store new data that arrived after 60 days in the contact center.

A second option for the customer is to create a data warehouse solution. Data warehousing allows the customer to install a separate server with separate software coming from vendors such as, Oracle or IBM other than the contact center vendors. The customer copies the data from the contact center reporting system databases into the data warehouse solution that is stored inside its own private LAN. Then, the contact center develops the report for the contact center from scratch on top of the data warehouse solution. This can be an expensive and time consuming option for the customer, as the customer has to invest a significant amount of time and money in buying additional software, servers, or storage. Also, the customer has to invest a lot of money in processing power to be able to copy the data from the standard contact center on-premises equipment to the data warehouse system. Typically, this approach is achieved through a process of borrowing a significant amount of processing power, requiring quite a big investment. These are the challenges for the on-premises software in the contact center environment.

In another, pure cloud-based, approach, vendors detail the customers for whom they do not need to install any on-premises equipment or hardware. A general definition for "the cloud" or "cloud-computing," for purposes of this disclosure, is the utilization of virtual servers available over the Internet and not in situ or at the premises, e.g., at the contact center. In this approach, the vendors provide a reporting system stored in the cloud (at the remote servers), where the customer is connected to a cloud-based server through a communication network (e.g., the Internet), in order to view and run the stored reports. However, for the cloud-based solutions, the challenges are different. A lot of customers do not want a purely cloud-based contact center environment. This means they are willing to install on-premises equipment but do not want to run a truly cloud-based contact center environment. Also, in the pure cloud-based solution, the customer's voice and data is arriving from the cloud and they do not have anything stored in the on-premises equipment. If there is no Internet connection, agents of the contact center may not be able to provide customer services to the incoming contacts. This is one of the major limitations of the "cloud-based only" approaches in the contact center environment.

There is thus a need for a system and method for handling relatively large contact center information and data in the contact center reporting environment, without investing relatively large amounts of time and money in processing power, storage, servers, manpower and so forth.

SUMMARY

Embodiments in accordance with the present invention provide an information managing system for managing contact center information. The information managing system includes a plurality of receivers for receiving information from at least one data collector. The information managing system further includes a plurality of databases for storing the information received from the at least one data collector. The information managing system further includes a report generator comprising a user interface for receiving a plurality of search queries from a plurality of users. The information managing system further includes a database interface layer for performing one or more lookups on the plurality of databases based on the plurality of search queries received from the plurality of users, wherein results of the one or more lookups are displayed on the user interface of the report generator.

Embodiments in accordance with the present invention further provide a computer-implemented method for managing contact center information. The computer-implemented method includes receiving information from at least one data collector by a plurality of receivers, storing the information received from the at least one data collector in a plurality of databases, receiving a plurality of search queries from a plurality of users by a report generator having a user interface, and performing one or more lookups on the plurality of databases based on the plurality of search queries received from the plurality of users by a database interface layer, wherein results of the one or more lookup are displayed on the user interface of the report generator.

Embodiments in accordance with the present invention further provide a computer readable medium storing computer readable instructions when executed by a processor performs a method. The method includes receiving information from at least one data collector by a plurality of receivers, uncompressing the compressed files and inserting data of the files into a plurality of databases by a bus, storing the information received from the at least one data collector in a plurality of databases with a unique identifier, receiving a plurality of search queries from a plurality of users by a report generator having a user interface, and performing one or more lookups on the plurality of databases based on the plurality of search queries received from the plurality of users by a database interface layer, wherein results of the one or more lookups are displayed on the user interface of the report generator.

Embodiments of the present invention provide a number of advantages depending on its particular configuration. First, embodiments of the present invention allow the customers to scale the contact center environment and also allow the running of big data analytics without investing time and money in enormous infrastructure. Therefore, a normal or medium-sized customer may have to invest a small amount of money for a basic contact center infrastructure. Next, embodiments of the present invention allow the customer to dynamically move the information from the cloud with a secured data uploader that allows the customer to retrieve the information from the cloud with a small investment of per month. Therefore, embodiments of the present invention allow a customer to dynamically manage the information or data and also allow a customer to leverage a huge amount of data storage on a hosted, on demand reporting server on the cloud.

Further, in embodiments of the present invention, when the customer stores all the data in a localized location or database in the cloud, there is no geographical barrier for retrieving the data. That is, if a contact center has multiple websites across the world, then a customer of the contact center may perform cross regional data processing at a centralized location. Furthermore, embodiments of the present invention allow a customer to move the data to the cloud through the centralized location. Next, embodiments of the present invention provide a private reporting system to the customer in the cloud to collect the data and in addition allow the customer to utilize on-premises equipment in the contact center environment.

These and other advantages will be apparent from the disclosure of the present invention(s) contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein:

FIG. 4B illustrates agent and skill set data stored in a set of databases according to an embodiment of the present invention;

FIG. 8 depicts a flowchart of a method for performing lookup and displaying results to a user based on a search query received from the user according to an embodiment of the present invention.

Figure 1:
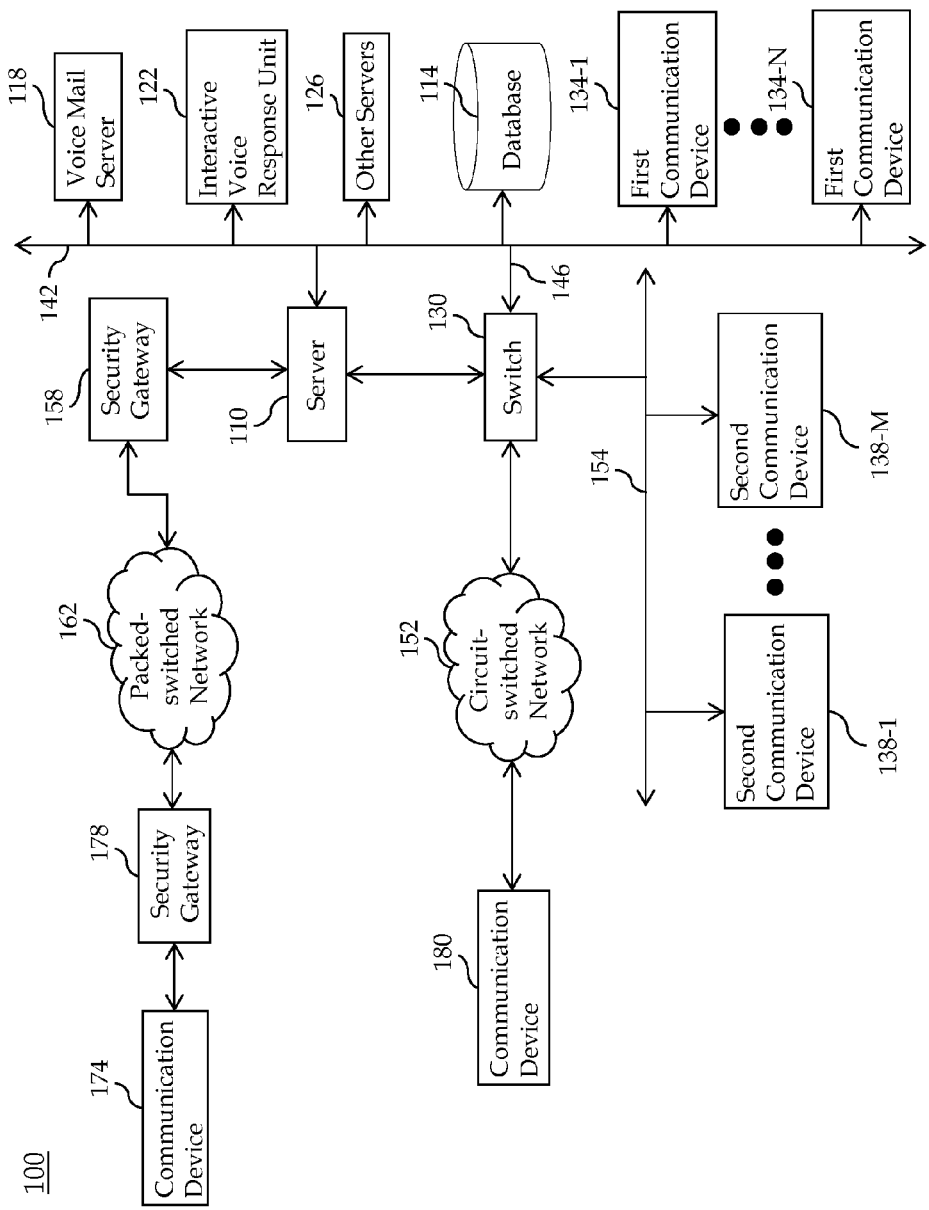
FIG. 1 illustrates a block diagram depicting a contact center according to an embodiment of the present invention.

The headings used herein are for organizational purposes only and are not meant to be used to limit the scope of the description or the claims. As used throughout this application, the word may is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

The present invention will be illustrated below in conjunction with an exemplary communication system, e.g., the Avaya Aura® system. Although well suited for use with, e.g., a system having an Automatic Call Distribution (ACD) or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

FIG. 1 shows an illustrative embodiment of the present invention. A contact center 100 comprises a server 110, a set of data stores or databases 114 containing contact or customer related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)).

The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 152 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. The security gateway 158 may be implemented as hardware such as via an adjunct processor (as shown) or as a chip in the server.

Although the preferred embodiment is discussed with reference to client-server architecture, it is to be understood that the principles of the present invention apply to other network architectures. For example, the present invention applies to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the present invention does not require the presence of packet- or circuit-switched networks.

The switch 130 and/or server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company.

Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched. Each of the communication devices 138-1-M corresponds to one of a set of internal extensions Ext1-M, respectively. The second communication devices 138-1-M may include, for example, wired and wireless telephones, PDAs, H.320 videophones and conferencing units, voice messaging and response units, traditional computer telephony adjuncts, and any other communication device.

It should be noted that the present invention does not require any particular type of information transport medium between switch or server and first and second communication devices, i.e., the present invention may be implemented with any desired type of transport medium as well as combinations of different types of transport channels. In an embodiment of the present invention, the network may also be a cloud based network.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1 is in communication with a first communication device 174 via a security gateway 178, and the circuit-switched network 152 with an external second communication device 180.

In a preferred configuration, the server 110, the packet-switched network 162, and the first communication devices 134-1-N are Session Initiation Protocol (SIP) compatible and can include interfaces for various other protocols such as the Lightweight Directory Access Protocol (LDAP), H.248, H.323, Simple Mail Transfer Protocol (SMTP), Internet Message Access Protocol 4 (IMAP4), Integrated Services Digital Network (ISDN), E1/T1, and analog line or trunk.

It should be emphasized the configuration of the switch 130, the server 110, user communication devices, and other elements as shown in FIG. 1 is for purposes of illustration only and should not be construed as limiting the invention to any particular arrangement of elements.

As will be appreciated, the server 110 is notified via the LAN 142 of an incoming work item by the communications component (e.g., the switch 130, fax server, email server, Web Server, and/or other server) receiving the incoming work item as shown in FIG. 1. The incoming work item is held by the receiving telecommunications component until the server 110 forwards instructions to the component to forward or route the contact to a specific contact center resource, such as the IVR unit 122, the voice mail server 118, and/or first or second telecommunication devices 134-1-N, 138-1-M associated with a selected agent. The server 110 distributes and connects these work items to telecommunication devices of available agents based on the predetermined criteria noted above.

When the server 110 forwards a voice contact (or first work item) to an agent, the server 110 also forwards customer-related information from the database 114 to the agent's computer work station for viewing (such as by a pop-up display) to permit the agent to better serve the customer to achieve desired business goals (e.g., an average revenue, a customer satisfaction (CSAT), a service level agreement, etc.). Depending on the contact center configuration and current status of the business goals, the server 110 may reallocate the work items to the agents. The agents process the work items or contacts sent to them by the server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

Figure 2:
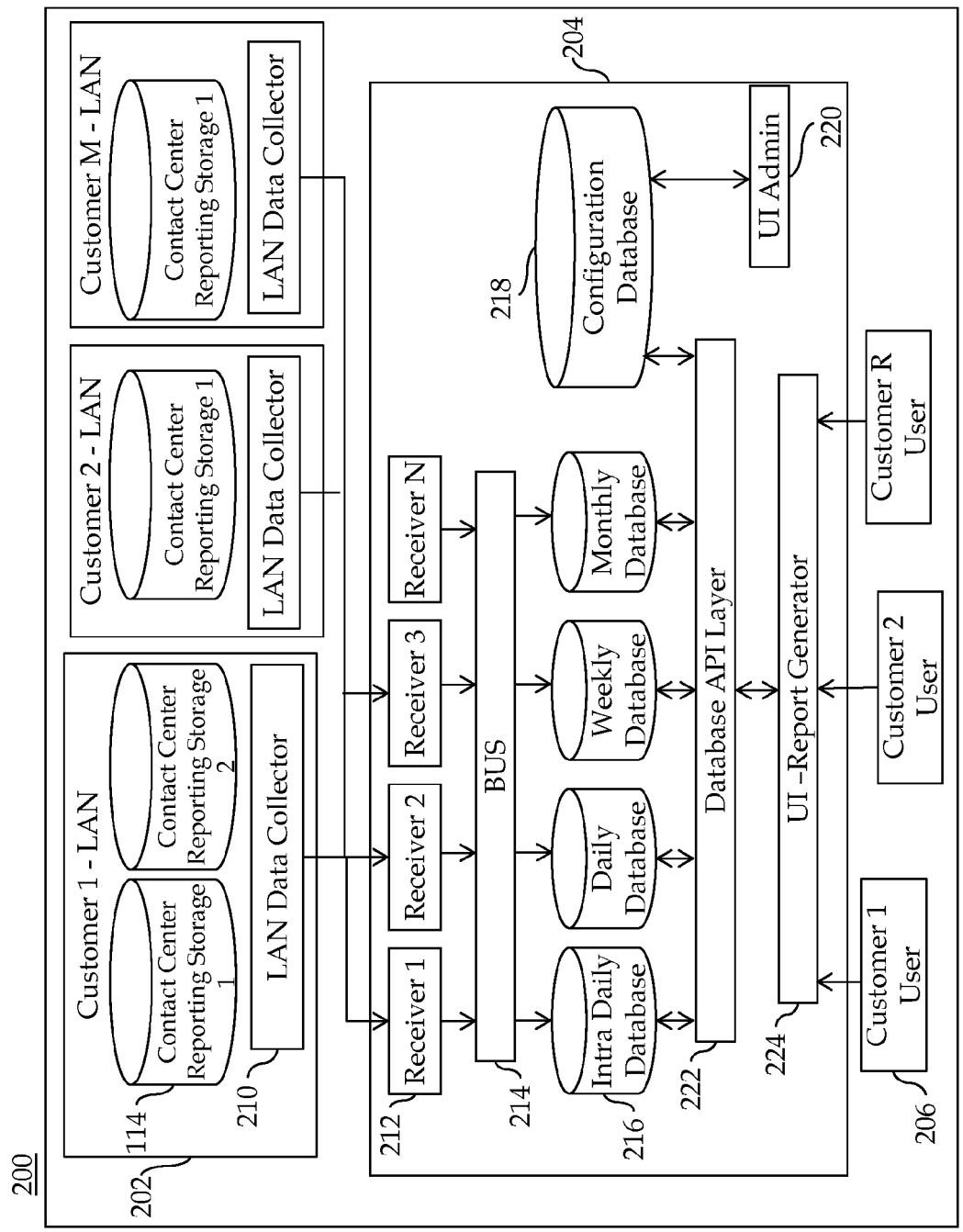
FIG. 2 illustrates an architecture of a managing system according to an embodiment of the present invention.

FIG. 2 illustrates architecture of an information managing system 200 according to an embodiment of the present invention. The information managing system 200 may be a hosted contact center reporting solution in an embodiment of the present invention. The architecture of the information managing system 200 may include a plurality of LAN customer 202-1-M, a hosted on demand reporting platform or server 204, and a plurality of customer-user 206-1-R. The plurality of LAN customer 202-1-M (for example, Avaya, Cisco, Genesis, and so forth) may further include on premises equipment such as, a plurality of contact center reporting storage or database 114, and a LAN data collector 210. The contact center reporting storage 114 may store contact center related information such as, but is not restricted to, reports on agents, queues, agent's skill sets, hunt group, routing point, routing rules, agent groups and trunks.

As used herein, the term "agent skill set" refers to the set of agent data that is used by the contact center to characterize an agent. Such agent's skill sets may include biographical agent data, demographic agent data, and external or internal behavioural agent data, to name a few. The behavioural data may include the agent's history with respect to the contact center and/or any other entity. However, the agent data is not limited in this regard and may include any other type of agent data used by the contact center to characterize or classify the agents. Further, the agent data may include any other agent data collected from one or more sources external to the contact center. Additionally, the agent profile may be raw data or processed agent data. That is, the agent data may be analyzed to characterize the agent and thereafter used to provide customized or personalized services to the user/customer. For example, an agent profile may be a set of values associated with an agent and a set of characteristics, where the values are selected based on the agent data obtained. However, the disclosure is not limited in this regard and any other methods for evaluating agent data to provide services that can be used without limitation.

In another embodiment of the present invention, the contact center reporting storage 114 may include voice call recordings of contact calls.

The LAN data collector 210 is configured to retrieve the information from the contact center reporting storage 114 in an embodiment of the present invention. The LAN data collector 210 may retrieve the information from the contact center reporting storage 114 in predefined intervals. The predefined intervals may include, but is not restricted to, an intra daily interval, a daily interval, a weekly interval, and a monthly interval. In the intra daily summary interval, the plurality of LAN customer 202-1-M may configure the LAN data collector 210 to retrieve intra daily information from the contact center reporting storage 114 at the number of minutes for example, 1 minute, 15 minutes, 30 minutes, and so forth. In the daily summary interval, the plurality of LAN customer 202-1-M may configure the LAN data collector 210 to retrieve daily summary information from the contact center reporting storage 114 once a day. The daily data is the summary of the intra daily summary that includes a single record for the day the customer report on.

Next, in the weekly summary interval, the plurality of LAN customer 202-1-M may configure the LAN data collector 210 to retrieve the weekly summary information once a week from the contact center reporting storage 114. Further, in the monthly summary interval, the plurality of LAN customer 202-1-M may configure the LAN data collector 210 to retrieve the weekly summary information once a month from the contact center reporting storage 114. In another embodiment of the present invention, the LAN data collector 210 is configured to copy information from the on-premises equipment of the plurality of LAN customer 202-1-M.

Next, in an embodiment of the present invention, the LAN data collector 210 creates compressed files for each interval for the copied or retrieved information. The compressed file may include, but is not restricted to, an intra daily summary, the daily summary, the weekly summary, and the monthly summary. When the information is copied from the on-premises equipment of the plurality of LAN customer 202-1-M, it is stored on a cloud based platform. In an embodiment of the present invention, the LAN data collector 210 may have a unique identification number that is attached to the information inserted into the set of databases 216. The cloud based platform may be the hosted on demand reporting server 204 in an embodiment of the present invention. The hosted on demand reporting server 204 is fully multi-tenant and is able to scale or support thousands or tens of thousands of the plurality of LAN customer 202-1-M to store their reporting information into the cloud.

These compressed files are then uploaded over a secure connection to the hosted contact center reporting server 204. In an embodiment of the present invention, the hosted contact center reporting server 204 may include a plurality of receivers 212-1-N that are configured to receive these compressed files from the plurality of LAN customers 202-1-M in parallel. For example, every customer in the world has a managing system and is uploading data on a same time, so the plurality of receiver 212-1-N have the ability to scale a plurality of customers automatically in order to receive customer's files in parallel. The hosted contact center reporting server 204 may use a network load balancer (not shown in figure) in front of them to receive the compressed files from the LAN data collector 210. The network load balancer (not shown in the figure) may have the ability to balance or spread out the amount of bandwidth used by each LAN customer in order to increase the total amount of bandwidth available.

In an embodiment of the present invention, the plurality of receivers 212-1-N may have a single Internet Protocol address (IP address) that may be accessed by one or more LAN data collector 210. In an embodiment of the present invention, every LAN customer may have a private folder in the hosted on demand reporting server 204 that is encrypted and is locked with a security specifically for the LAN customer.

The compressed files are then received by a bus 214 in order to uncompress the files and insert and store data from the files to a set of databases 216. In an embodiment of the present invention, there may be a dedicated database for each of reported element (for example, agents, queues, agent skills, hunt groups, routing points and so forth) and time interval. In another embodiment of the present invention, the set of databases 216 may include, but is not restricted to, four different databases based on the time interval. The set of databases 216 may include, but is not restricted to, an intra daily database, a daily database, a weekly database, and a monthly database. The intra daily database may include data that is received in every 1 minute, 15 minutes, 30 minutes, and so forth based on the LAN customer configuration. Further, the daily database may include the summary of the intra daily data. Therefore, the plurality of LAN customer 202-1-M may have a single record till the day they report on. Likewise, there are weekly and monthly database that may include summary of a week and a month. The hosted on demand reporting server 204 may further include a configuration database 218 that stores configuration data for the plurality of LAN customer 202-1-M. The configuration database 218 is further connected to a User Interface Admin (UI Admin) 220 that is an administrative user interface of the information managing system 200. The UI Admin 220 may allow populating of the data that is stored in the configuration database 218.

The configuration database 218 is also connected to a database Application Programming Interface (API) layer 222, which is responsible for performing lookup across the set of databases 216 for a search query received from the user customer 206-1-R. In an embodiment of the present invention, the query may be a Structured Query Language (SQL) query that is designed for managing data held in a relational database management system. In another embodiment of the present invention, the query may be any other type of query. Further, the database API layer 222 may have the ability to join database from several separate databases into a single query that is displayed by a User Interface (UI) report generator 224. The plurality of user customers 206-1-R may be users or agents of the LAN customer 202-1-M in an embodiment of the present invention.

Figure 3:
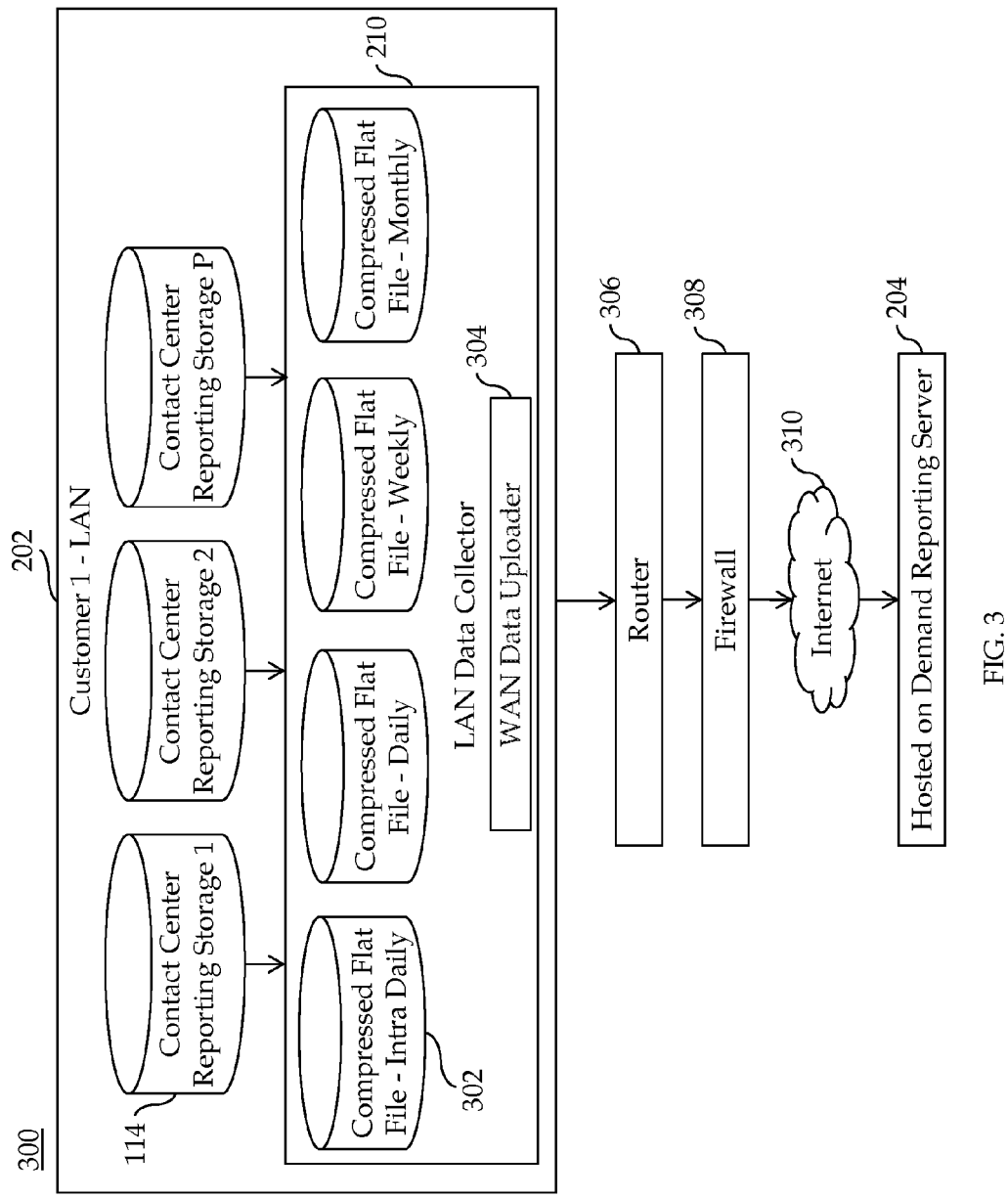
FIG. 3 illustrates an architecture of a LAN data collector according to an embodiment of the present invention.

FIG. 3 illustrates an architecture 300 of the LAN data collector 210 that is connected to the hosted on demand reporting server 204 according to an embodiment of the present invention. In an embodiment of the present invention, the LAN data collector 210 is a software component that is installed in the on-premises equipment in a customer LAN environment. The LAN data collector 210 is connected to the plurality of contact center reporting storages 114-1-P as shown in FIG. 3. The LAN data collector 210 is configured to retrieve the information from the contact center reporting storages 114-1-P. The LAN data collector 210 may retrieve the information from the contact center reporting storages 114-1-P based on configurable parameters such as, but is not restricted to, in predefined intervals. The predefined intervals may include, but is not restricted to, an intra daily interval, a daily interval, a weekly interval, and a monthly interval. In the intra daily interval, the LAN data collector 210 is configured to retrieve intra daily information from the contact center reporting storage 114 at the number of minutes for example, 1 minute, 15 minutes, 30 minutes, and so forth. In the daily interval parameter, the LAN data collector 210 is configured to retrieve daily summary information from the contact center reporting storage 114 once a day.

The daily data is the summary of the intra daily summary that includes a single record for the day the customer report on. Next, in the weekly interval parameter, the LAN data collector 210 is configured to retrieve the weekly summary information once a week from the contact center reporting storage 114. Further, in the monthly interval parameter, the LAN data collector 210 is configured to retrieve the weekly summary information once a month from the contact center reporting storage 114. In another embodiment of the present invention, the LAN data collector 210 is configured to copy information from the on-premises equipment of the plurality of LAN customer 202-1-M.

The LAN data collector 210 may also be leveraged to collect other data from the contact center environment for example, voice call recordings of customer calls. In an embodiment of the present invention, every customer call is recorded in a contact center generics .wav file format. The LAN data collector 210 may move a plurality of voice files into cloud based storage such as, the hosted on demand reporting server 204 for multiple purposes such as, for recordings, for speech analytics, and for other analytic capabilities i.e. leveraging a hybrid model of the contact center where heavy listing of processing is done while the data collection is done on the contact center environment.

Further, the LAN data collector 210 may include a set of compressed flat file databases 302 that may store compressed files of information that is copied or retrieved data from the plurality of contact center reporting storage 114-1-P. In an embodiment of the present invention, the set of compressed flat file databases 302 may include 4 different databases such as, a compressed flat file intra daily database, a compressed flat file daily database, a compressed flat file weekly database, and a compressed flat file monthly database. The data is retrieved by the LAN data collector 210 by using search queries received from the users on top of the plurality of contact center reporting storages 114-1-P.

In an embodiment of the present invention, the search queries may be SQL queries. The search queries may be any other queries in another embodiment of the present invention. Results of the search queries are stored in the flat file database that is compressed. The LAN data collector 210 may also include a Wide Area Network (WAN) data uploader 304 that opens a secure session with the hosted on demand reporting server 204 which further helps the LAN data collector 210 to upload the compressed files via a router 306, a firewall 308 and the Internet 310 on the hosted on demand reporting server 204. In an embodiment of the present invention, the LAN data collector 210 may upload the compressed files to the hosted on demand reporting server 204 based on the configurable parameters.

Figure 4A:
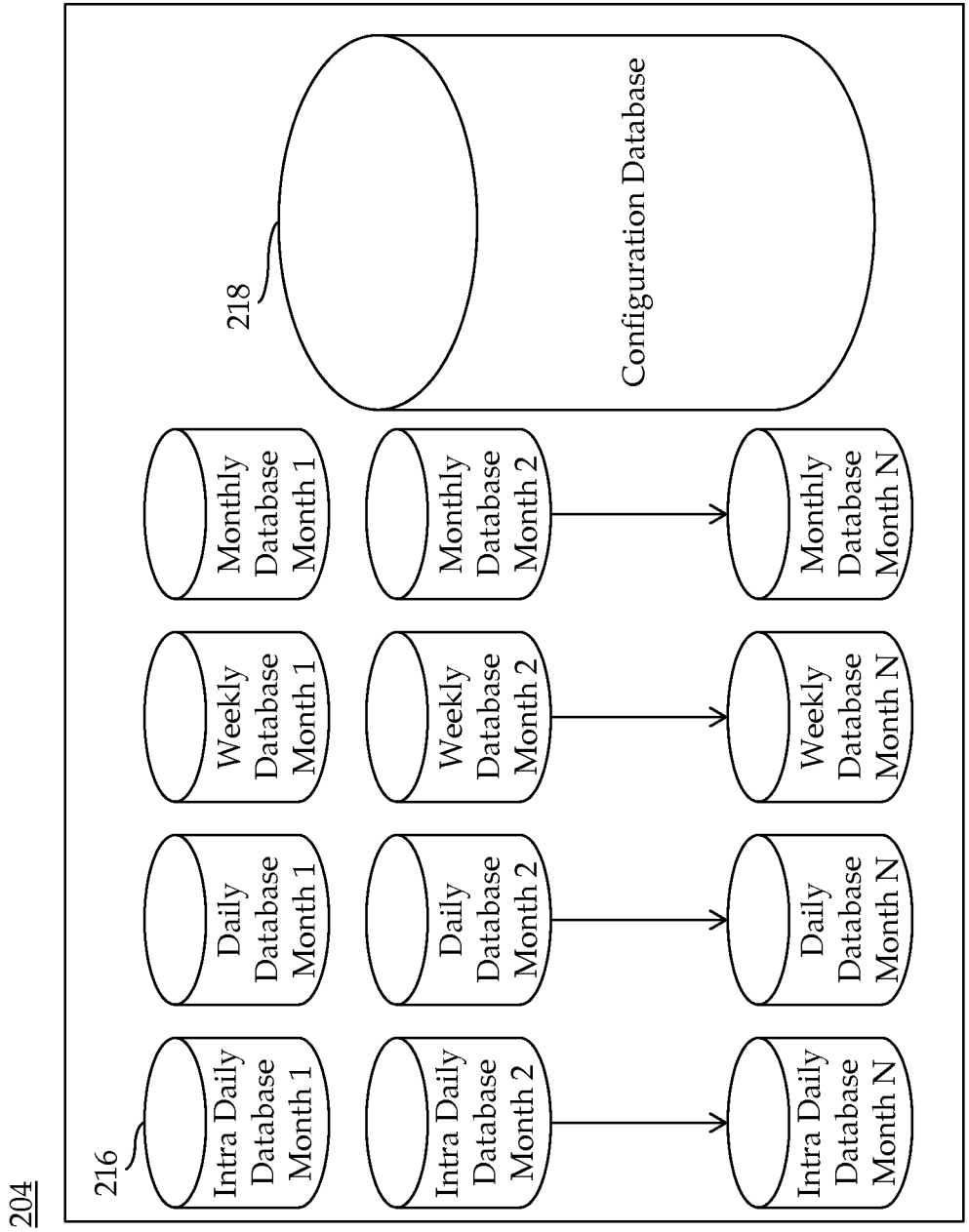
FIG. 4A illustrates a database structure of the managing system of FIG. 2 according to an embodiment of the present invention.

FIG. 4A illustrates a database structure of the information managing system 200 according to an embodiment of the present invention. The hosted on demand reporting server 204 may include the set of databases 216 that may store the copied or retrieved information from the contact center reporting storage 114-1-P. The set of databases 216 may include, but is not restricted to, an intra daily database for month 1 to month N, a daily database for month 1 to month N, a weekly database for month 1 to month N, and a monthly database for month 1 to month N. The configuration database 218 stores the configuration parameters for example, predefined intervals of the LAN customer 202-1-M.

In an embodiment of the present invention, the way the data is stored in the set of databases 216 in the reporting server 204 is also an important element of the present invention. The information managing system 200 may store the data from thousands or tens of thousands of LAN customer 202-1-M in parallel. In the set of databases 216 of the hosted on demand reporting server 204, each LAN customer may have its own set of tables in the set of databases 216 in order to store their data.

When a LAN customer is registered in the information managing system 200, he gets a private set of table in the set of databases 216 having a naming convention that represents the LAN customer and a table type associated with the LAN customer 202-1-M. In an embodiment of the present invention, the naming convention may be a unique identification number, customer tenant number of the LAN customer 202-1-M. The set of databases 216 may have the capability to dynamically create the set of tables and structures for the LAN customer 202-1-M. Also, the data from the set of tables in the set of databases 216 is removed or deleted when the LAN customer 202-1-M ends a subscription with the managing system.

FIG. 4B illustrates an agent and his skill set data stored in a set of database according to an embodiment of the present invention. FIG. 4B shows that each reported element and each time interval has its own set of tables in the set of databases 216 in the reporting server 204. The database 216 in the reporting server 204 may store an agent's intra daily, daily, weekly and monthly summary. For example, an agent's intra daily summary stored in the set of database 216 may include, but is not restricted to, data of January 2013, February 2013, and so forth. It may also store data of an agent's skill that is utilized in the contact center environment in the predefined interval, such as, an intra daily interval, daily, weekly or monthly interval. Further, in an embodiment of the present invention, the database 216 may be created automatically in the predefined interval. For example, every first day of a month may create a new set of database for each of the reported element. The data is stored in each of the set of table that is linked to the configuration database 218. The link to the configuration database 218 is done based on each data collector's unique identification number. In an embodiment of the present invention, the configuration database 218 may also store dictionary related items such as, mapping between numbers to strings. For example, name of an agent with an identification number "55555" is "ArkadyKarpman".

Figure 5:
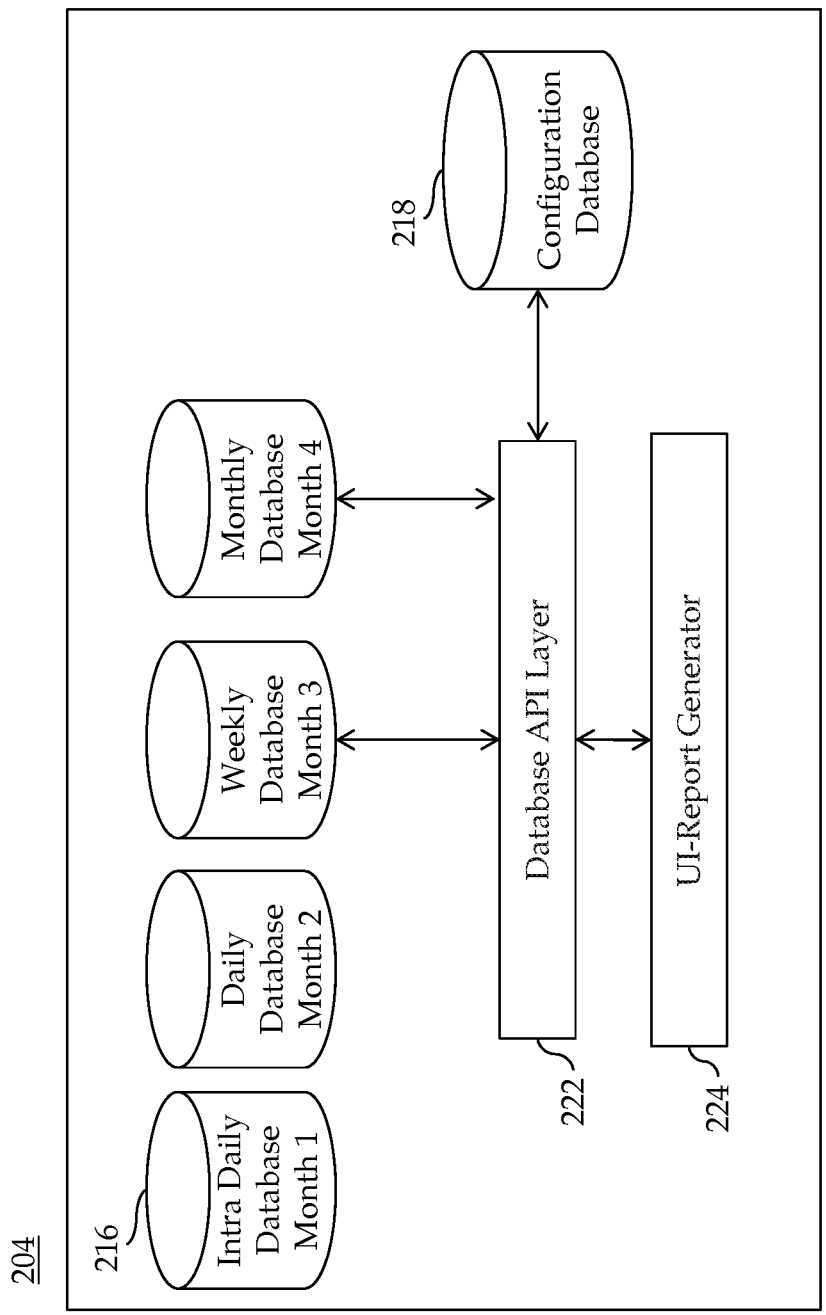
FIG. 5 illustrates architecture of the managing system database interface layer according to an embodiment of the present invention.

FIG. 5 illustrates architecture of the information managing system 200 database API Layer 222 according to an embodiment of the present invention. The information managing system 200 has the database API layer 222 that is responsible for retrieving the reporting data from the set of databases 216 as a single result. A user triggers a search query by using the UI report generator 224, for example, get statistic 1 for an agent named "ArkadyKarpman" between dates of Jan. 1, 2013 to Mar. 1, 2013. In an embodiment of the present invention, the search query may be a SQL query. The query may be any other query in another embodiment of the present invention. The user search query includes a customer unique identification or tenant number, which is then sent to the database API layer 222. The database API layer 222 first retrieves from the configuration database 218 connection details of the set of databases 216 in the information managing system 200 that stores the required reporting data.

In an embodiment of the present invention, the connection details of the set of databases 216 may include a database in which the required reporting data is stored. This may be due to the fact that the required reporting data is spread across a set of database. Based on the retrieved connection details from the configuration database 218, the database API layer 222 performs lookup in the set of databases 216 for the user's search query. As shown in FIG. 5, the database API layer 222 runs the user search query in the weekly database month 3 and monthly database month 4 and filter out the required reporting data from the database 216. The result of the search query from the weekly database month 3 and monthly database month 4 is displayed to the user in the UI report generator 224 as a single result set.

Figure 6:
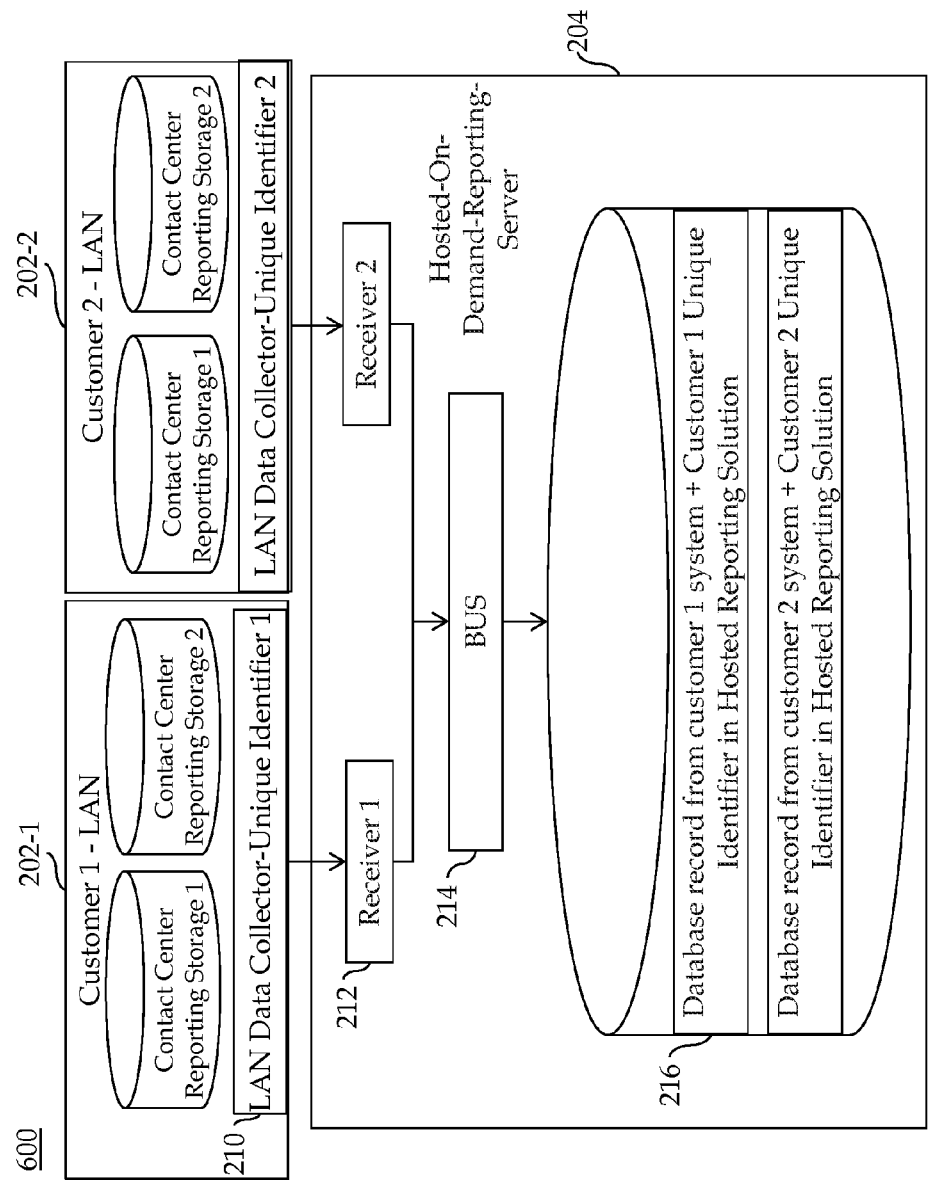
FIG. 6 illustrates an architecture of a managing system customer segmentation according to an embodiment of the present invention.

FIG. 6 illustrates architecture of the information managing system customer segmentation according to an embodiment of the present invention. The information managing system 200 may store information of multiple LAN customers in the contact center reporting storage 114. In order to make sure that the reporting data is completely segmented in the database 216 and a LAN customer 202-1 cannot see the information associated with LAN customer 202-2, the information managing system 200 stores the information as records in the database 216 with a unique identifier. In an embodiment of the present invention, the unique identifier may include, but is not restricted to, a customer tenant number, a unique identification number and so forth. Every LAN data collector 210 that is configured to copy or retrieve data from the contact center reporting storage 114 is assigned with the unique identifier. The LAN data collector 210 passes this unique identifier with the compressed data files to the plurality of receivers 212 of the reporting server 204. The bus interface 214 of the reporting server 204 extracts data from the compressed files and inserts the data into the database 216. All the data that is collected from the LAN customers 202-1-2 are stored in a shared database but every record in the shared database is stored with the unique identifier assigned to each of the LAN customer 202.

As shown in FIG. 6, a database record of the LAN customer 202-1 is stored with a unique identifier 1 that is assigned to the LAN customer 202-1 by the information managing system 200. Similarly, a database record from the LAN customer 202-2 is stored with a unique identifier 2 that is assigned to the LAN customer 202-2 by the information managing system 200. This segmentation of the database record in the database 216 with the unique identifier may help the database API layer 222 to filter results for the user's search queries based on the unique identifier number.

Figure 7:
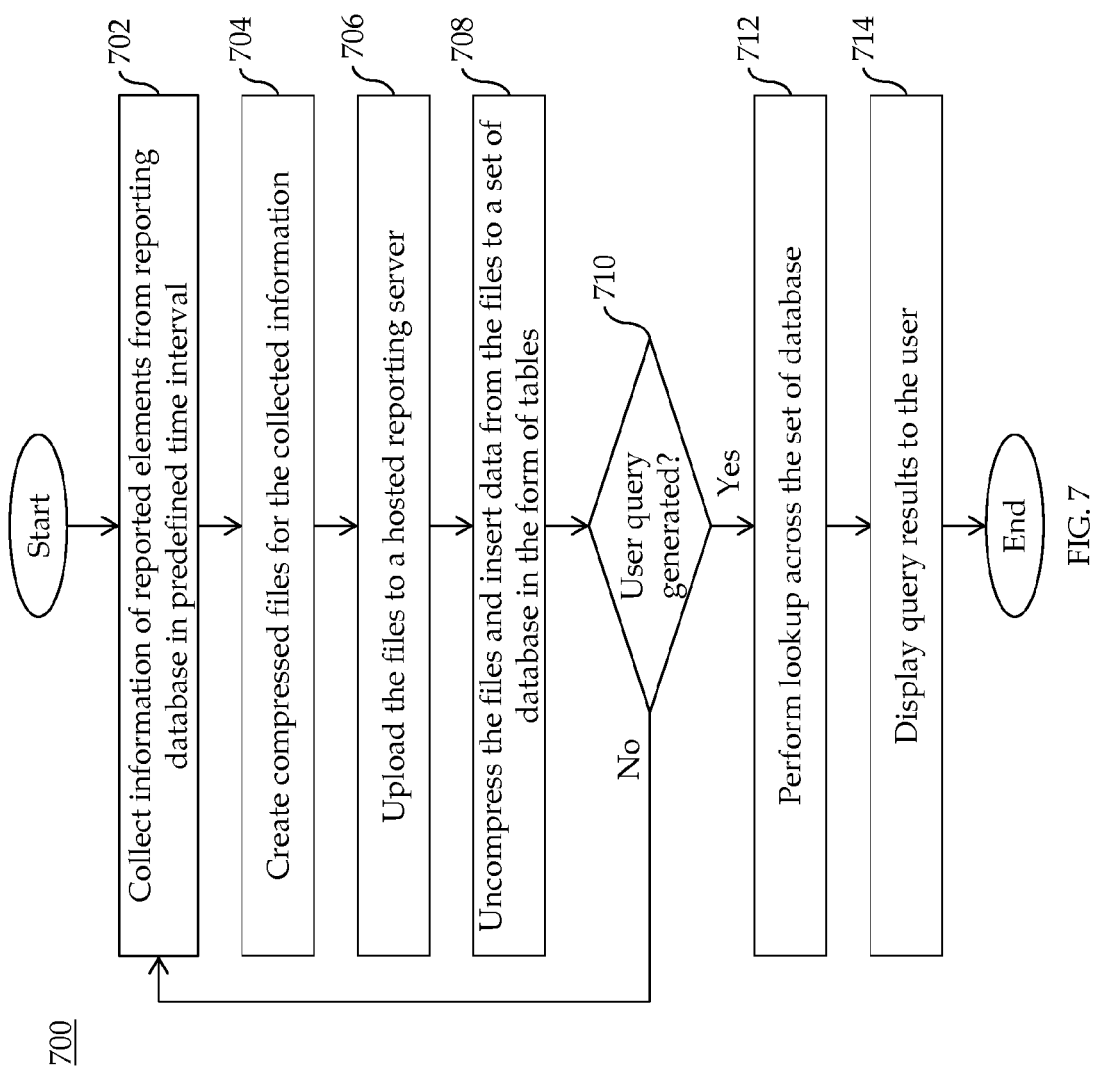
FIG. 7 depicts a flowchart of a method for reporting data of a contact center on a remote storage collected in a private LAN according to an embodiment of the present invention.

FIG. 7 depicts a flowchart of a method 700 for reporting data of a contact center on a remote storage that is collected in a private LAN according to an embodiment of the present invention.

At step 702, an information managing system 200 collects information of reported elements from a contact center reporting storage in an embodiment of the present invention. The reported elements may include, but is not restricted to, agents, queues, hunt group, routing point, routing rules, agent groups, trunks and so forth. The information may include, but is not restricted to, reports on agents, agent's skill sets, customer queues, hunt groups, routing points, routing rules, agent groups, trunks and so forth.

In an embodiment of the present invention, the information managing system 200 may collect the information of the reported elements from the contact center reporting storage in predefined intervals. The predefined intervals may include, but is not restricted to, an intra daily interval, a daily interval, a weekly interval, and a monthly interval. In the intra daily interval, the information is retrieved from the contact center reporting storage at the number of minutes for example, 1 minute, 15 minutes, 30 minutes, and so forth. In the daily interval, the information is retrieved once a day and includes a single record for the day the customer report on. Next, in the weekly interval, the information is retrieved once a week from the contact center reporting storage. Further, in the monthly interval, the information is retrieved once a month from the contact center reporting storage. In an embodiment of the present invention, the LAN data collector 210 is configured to collect the information from the contact center reporting storage.

At step 704, the information managing system 200 creates compressed files for each interval for the collected or retrieved information in an embodiment of the present invention. The compressed file may include, but is not restricted to, an intra daily data, the daily summary, the weekly summary, and the monthly summary.

At step 706, the information managing system 200 uploads the compressed files over a secure connection to a hosted on demand reporting server in an embodiment of the present invention. The reporting server may be cloud based storage in an embodiment of the present invention. Every LAN customer may have a private folder in the reporting server 204 that is encrypted and locked with a security specifically for a LAN customer. Also, the information managing system 200 uploads the files with a unique identifier that is assigned to the LAN customer. In an embodiment of the present invention, the unique identifier may include, but is not restricted to, a customer tenant number, a unique identification number of customer, and so forth.

At step 708, the information managing system 200 uncompresses the files and data of the files are inserted to a set of database in the form of tables in an embodiment of the present invention. There may be a dedicated database for each of the reported element (for example, agents, queues, agent skills, hunt groups, routing points and so forth) and interval time. In another embodiment of the present invention, the set of databases 216 may include, but is not restricted to, a set of four different databases based on the predefined time interval. The set of databases may include, but is not restricted to, an intra daily database, a daily database, a weekly database, and a monthly database. In an embodiment of the present invention, a bus interface is configured to uncompress the files and insert the data into the set of databases. All the data is stored in a shared database table but every record in the shared database table is inserted with the unique identifier of the LAN customer.

At step 710, the information managing system 200 determines whether a search query is generated by a user. In an embodiment of the present invention, the search query may be a SQL query. The query may be any other query in another embodiment of the present invention. The user may be an agent or a supervisor of the LAN customer 202-1-M in an embodiment of the present invention. When it is determined that no query is generated the method 700 returns to step 702. Otherwise, the method 700 proceeds towards step 712.

At step 712, the information managing system 200 performs lookup across the set of database based on the user's search query in an embodiment of the present invention. The user's search query includes a unique identifier that helps the information managing system 200 to filter the reporting data from the set of databases based on the user query. In an embodiment of the present invention, the database API layer 222 is configured to perform the lookup across the set of database.

At step 714, the information managing system 200 displays search query results to the user in an embodiment of the present invention. The search query results are displayed on the report generator having a user interface in an embodiment of the present invention.

FIG. 8 depicts a flowchart of a method 800 for performing lookup and displaying results to a user based on a search query received from the user according to an embodiment of the present invention.

At step 802, an information managing system 200 receives a search query from a user in an embodiment of the present invention. The user may be an agent or a supervisor of the LAN customer 202-1-M in an embodiment of the present invention. In an embodiment of the present invention, the search query may be a SQL query. The search query may be any other query in another embodiment of the present invention. The search query includes a customer unique identifier in an embodiment of the present invention.

At step 804, the information managing system 200 extracts the unique identifier from the search query in an embodiment of the present invention. The unique identifier may include, but is not restricted to, a customer tenant number, a unique identification number and so forth. The unique identifier is assigned to every LAN customer 202-1-M by the information managing system 200.

At step 806, the information managing system 200 determines a set of database based on the unique identifier in an embodiment of the present invention. The information managing system 200 determines a database that may store required reporting data of the received search query by identifying the unique identifier in the database that may have the same unique identifier. The unique identifier may help the information managing system 200 to search for the required results in the set of database.

At step 808, the information managing system 200 performs lookup across the set of database in an embodiment of the present invention. The unique identifier helps the information managing system 200 to filter the reporting data from the set of databases based on the user search query. In an embodiment of the present invention, the database API layer 222 is configured to perform the lookup across the set of database.

At step 810, the information managing system 200 displays search query results to the user in an embodiment of the present invention. The search query results are displayed on the report generator having a user interface in an embodiment of the present invention.

The exemplary systems and methods of this present invention have been described in relation to a contact center. However, to avoid unnecessarily obscuring the present invention, the preceding description omits a number of known structures and devices. This omission is not to be construed as a limitation of the scope of the present invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An information managing system to manage contact center information, the managing system comprising:
    a plurality of receivers, located off-premises from a plurality of contact centers, to receive information from a respective data collector located on-premises with each of the plurality of contact centers, wherein a respective unique identifier is associated with each respective data collector;
    a plurality of databases to store the information received from each of the respective data collectors with its associated unique identifier;
    a report generator comprising a user interface to receive a respective search query from each of a plurality of users; and
    a database interface layer to perform a respective lookup on the plurality of databases based on each search query, wherein a corresponding result of each lookup is displayed by the user interface of the report generator.

2. The managing system of claim 1, wherein the information from the respective data collector comprises respective reports on a plurality of contact center elements, wherein the respective reports comprise reports on agents, queues, agent's skill sets, hunt group, routing point, routing rules, agent groups and trunks.

3. The managing system of claim 2, wherein the plurality of contact center elements comprise agents, queues, agent's skill sets, hunt group, routing point, routing rules, agent groups and trunks.

4. The managing system of claim 1, wherein the plurality of receivers have a single Internet Protocol (IP) address that is accessed by the respective data collectors.

5. The managing system of claim 1, wherein the plurality of receivers receives the information from each of the respective data collectors as a respective compressed file at each of a plurality of predefined intervals.

6. The managing system of claim 5, wherein the predefined intervals comprise an intra daily interval, a daily interval, a weekly interval, and a monthly interval.

7. The managing system of claim 5 further comprising:
    a bus interface configured to uncompress each of the respective compressed files and insert data from the respective compressed files in the plurality of databases.

8. The managing system of claim 1, wherein the plurality of databases stores the information received from the respective data collector as a plurality of records each with the associated unique identifier of the respective data collector.

9. The managing system of claim 8, wherein the associated unique identifier is one of a customer tenant number or a customer's unique identification number.

10. The managing system of claim 1, wherein the received information from the respective data collector comprises data related to a plurality of different contact center elements for a plurality of different time intervals and the plurality of databases comprise a dedicated database for each subset of the data related to a unique pair of (a) one of the different contact center elements and (b) one of the different time intervals.

11. The managing system of claim 1, wherein the respective search queries are Structured Query Language (SQL) queries.

12. The managing system of claim 1, wherein each respective search query comprises one of the associated unique identifiers that helps the database interface layer to filter the corresponding result of each respective search query based on the associated unique identifier.

13. A computer-implemented method to manage contact center information, the method comprising:

receiving, by a plurality of receivers located off-premises from a plurality of contact centers, information from a respective data collector located on-premises with each of the plurality of contact centers, wherein a respective unique identifier is associated with each of the respective data collectors;

storing, by a computer, the information received from each of the respective data collectors along with its associated unique identifier in a plurality of databases;

receiving, by the computer, a respective search query from each of a plurality of users through a user interface of a report generator; and performing, by a database interface layer of the computer, a respective lookup on the plurality of databases based on each of the respective search queries, wherein a corresponding result of each of the respective search queries is displayed by the user interface of the report generator.

14. The method of claim 13, wherein the information from the respective data collector comprises respective reports on a plurality of contact center elements, wherein the respective reports comprise reports on agents, queues, agent's skill sets, hunt group, routing point, routing rules, agent groups and trunks.

15. The method of claim 13, wherein the plurality of receivers receives the information from each of the respective data collectors as a respective compressed file at each of a plurality of predefined intervals.

16. The method of claim 15, wherein the predefined intervals comprise an intra daily interval, a daily interval, a weekly interval, and a monthly interval.

17. The method of claim 13, wherein the information received from the respective data collector is stored as a set of tables, in the plurality of databases, each with the associated unique identifier of the respective data collector.

18. The method of claim 17, wherein the associated unique identifier is one of a customer tenant number or a customer's unique identification number.

19. The method of claim 13, wherein the respective search queries are Structured Query Language (SQL) queries.

20. The method of claim 13, wherein the respective search query comprises one of the respective unique identifiers, the method comprising:

for the respective search query, determining, by the computer, a subset of the plurality of databases storing data related to the one of the respective unique identifiers, wherein the database layer limits performing the respective lookup to only the subset of the plurality of databases.

* * * * *

UNITED STATES PATENT AND TRADEMARK OFFICE
CERTIFICATE OF CORRECTION

PATENT NO. : 10,026,059 B2
APPLICATION NO. : 14/194196
DATED : July 17, 2018
INVENTOR(S) : Ariel Shtilman and Arkady Karpman It is certified that error appears in the above-identified patent and that said Letters Patent is hereby corrected as shown below:

On the Title Page

"(66) Substitute for application No. 61/772,271, filed on Mar. 4, 2013." should read:
--(60) Provisional application No. 61/772,271, filed on Mar. 4, 2013.--

Signed and Sealed this
Nineteenth Day of February, 2019

Andrei Iancu
*Director of the United States Patent and Trademark Office*